May 3, 1927. 1,626,901
W. E. WISH
ROAD VEHICLE LAMP
Filed April 7, 1925 2 Sheets-Sheet 1

Inventor
William Ernest Wish
By
Pennie, Davis, Marvin & Edmonds
Attorneys

May 3, 1927.  
W. E. WISH  
1,626,901  
ROAD VEHICLE LAMP  
Filed April 7, 1925  2 Sheets-Sheet 2

Patented May 3, 1927.

1,626,901

UNITED STATES PATENT OFFICE.

WILLIAM ERNEST WISH, OF EDGWARE, ENGLAND.

ROAD-VEHICLE LAMP.

Application filed April 7, 1925, Serial No. 21,259, and in Great Britain February 27, 1925.

This invention relates to lamps for road vehicles and more particularly to an arrangement of electric lamp whereby the effect known as "dazzle" may be reduced or obviated, and/or there may be obtained a laterally directed light useful in certain conditions.

A lamp made according to the present invention is of the kind in which a lateral beam is projected from one or more electric lamp bulbs separate from the electric lamp bulb from which the forwardly directed beam proceeds, so as to illuminate the off-side of the road, or the near side thereof, as the case may be, the forward and lateral illumination being simultaneous, when desired.

According to the present invention, however, the lamp casing is manually part-rotatable by means of a lever or handle about an axis which passes through the lamp casing and from front to rear thereof, and so as to permit the laterally-directed beam to be tilted up or down. The lamp casing is preferably oblong in shape and it may be provided with a front displaceable annular cap or hood in which event one of the lamps in the casing projects in advance of the joint between the cap and the casing. The casing may also be provided with a displaceable rear cap, so that one or more of the lamps in the casing can be utilized to project light through the rear of the casing when the latter is uncovered. The displaceable front and rear caps are useful when it is desired to inspect respectively the engine or radiator of the vehicle, and the rear part of the vehicle.

In another form, I separate the lamps inside the casing by means of a transverse reflecting partition arranged across the casing, and in a further form the casing may be fitted with a transparent panel formed or continued on each side of the casing.

In the accompanying drawings illustrating the present invention, Figure 1 is a plan view of one form of the improved lamp casing. Figure 2 is a front end view thereof. Figure 3 is a side elevation of Figure 1. Figure 4 is a side elevation similar to Figure 3 but showing the hinged forward cap lifted to unmask the lamp bulb. Figure 5 is a rear end view in section on the line 5—5 of Figure 1. Figure 6 is a plan of a modification. Figures 7 and 8 are front and side elevations of another modification.

The lamp casing $a$ may be of any suitable shape but is preferably oblong and is shown cylindrical. It is preferably of metal and is represented with a forward lens or glass $b$ with electric incandescent lamp bulb $c$ of the usual kind, and a supporting collar $d$ mounted on an upright or bracket $e$. The collar $d$ is adjustably clamped around the casing by the screw device $f$ (Figures 3, 4 and 5) so that the casing is held in position by friction, a handle $g$ allowing the casing to be partly rotated about its axis and within the supporting collar $d$.

The stem of the handle $g$ may pass through a longitudinal slot $d^1$ in the collar $d$ and be screw-threaded and provided with a locking nut $g^1$ to clamp the handle $g$ to the collar $d$.

Figure 1:
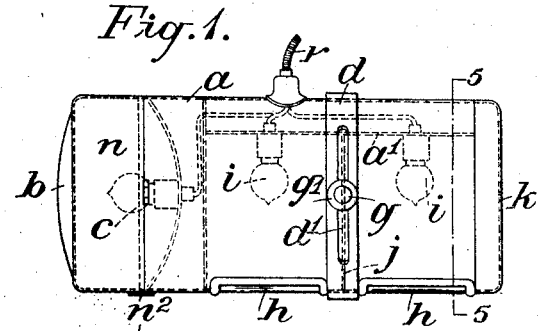
Figure 5:
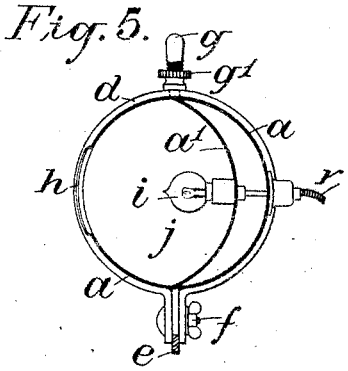

In Figures 1 to 5, I have shown two lateral panels $h$ made of transparent material such as celluloid, glass, or mica, through which panels the light beams from one or more lamp bulbs $i$ may project when such lamps are put into circuit. A cross partition $j$ may separate two of these lamps $i$, the surfaces of this partition $j$ forming reflectors. Obviously a single lateral panel $h$ may be used if preferred. The inside of the casing opposite the panel or panels $h$ may be employed as a reflector or a separate reflector $a^1$, as shown in Figures 1 and 5, may be provided.

A detachable cap $k$ (Figures 1 and 3) of metal or other opaque material may be screwed to the rear of the casing $a$ so that light from the rear bulb $i$ can be obtained through the open rear end of the casing, the cap being removed when this light is required. Instead of the cap $k$, an opaque hinged flap $l$ may be employed as shown in Figure 4, this flap being hinged at $m$ to the lower part of the casing $a$, and having a suitable snap or other fastening device $m^2$ to keep it closed when desired.

Figure 3:
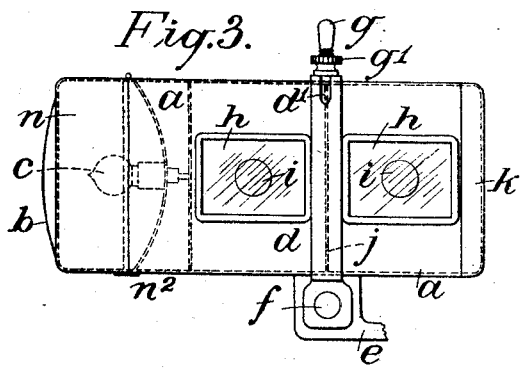
Figure 2:
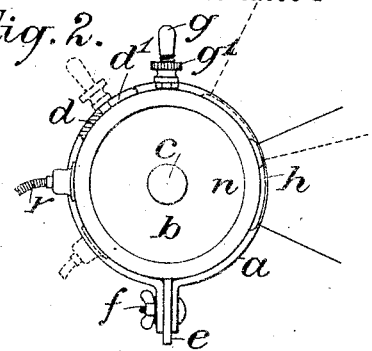
Figure 4:
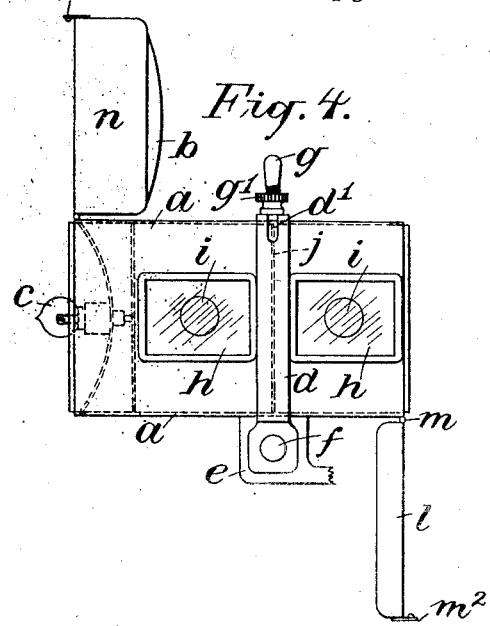
Figure 9:
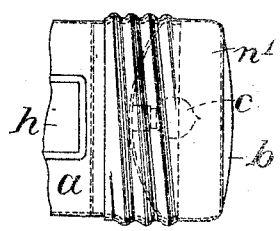
Figure 9 shows a modification of the forward cap of Figures 1, 3 and 4.

In Figures 1, 3 and 4, a metal or similar hood or shroud n is shown hinged to the casing a and this hood may also have a suitable fastening device as $n^2$; alternatively as illustrated in Figure 9, a detachable screw-threaded cap $n^1$ may be substituted.

Figure 6:
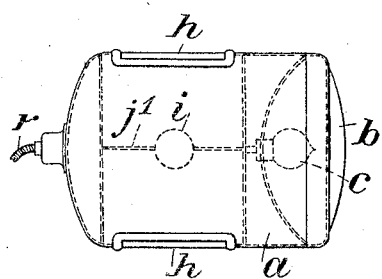

Figure 6 illustrates a form of lamp casing intended chiefly for motor cycles, in which transparent panels h are provided on both sides, light being projected simultaneously through both panels in a downward direction by a single bulb i. A reflecting partition $j^1$ may be arranged longitudinally of the casing in the plane of the bulb i.

Figure 7:
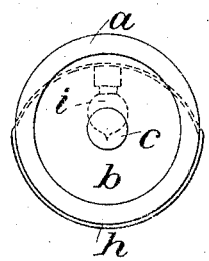
Figure 8:
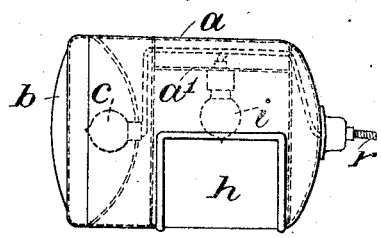

Figures 7 and 8 show a modification of the foregoing in which a single transparent panel h extends across the bottom of the casing, and is continued up to the level of the centre of the casing, so that the bulb i can illuminate the road surface beneath, as well as to both sides of, the lamp.

The parts d e f g are not illustrated in Figures 6, 7 and 8 but the clamp or collar d would pass around the casing a in advance of the panel or panels h.

Figure 10:
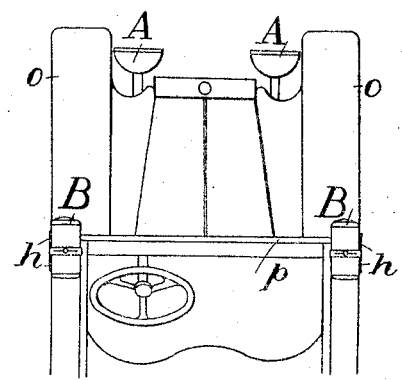
Figure 10 is a diagrammatic plan view of the front part of an automobile fitted with the improved lamps.

It is to be understood that this improved lamp may be employed for the headlights A or for the side lamps B of a vehicle (Figure 10). In the former case the headlights should be raised above the front wings or mudguards o, and in the latter case, the side lamps are preferably carried by the body of the vehicle or the pillar or upright of the windscreen p of the vehicle. Obviously where the invention is applied to headlights out of reach of occupants of the vehicle, a connection such as the well-known Bowden wire may be employed instead of the handle g to turn the casing a about its horizontal axis.

The lamps c and i are adapted to be put in circuit with the batteries or accumulators C carried by the vehicle, the leads from such lamps c and i being shown enclosed in for example the sheathed casing r.

Figure 11:
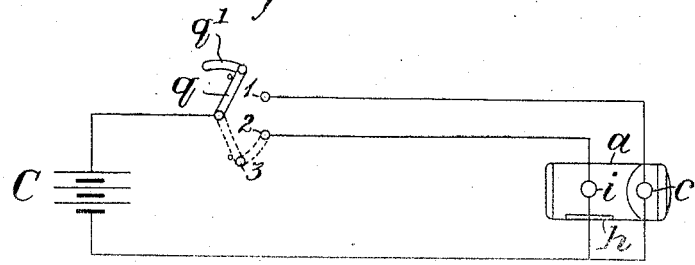
Figure 11 is a diagram of the electrical connections for controlling the forward and lateral beams of light by a single switch.

In operation, the lamp bulb c when switched on by the movement of the arm q to the position 1 (Figure 11), projects its forward beam through the lens or glass b; when lateral illumination is required, the lamp or lamps i is or are switched on by further movement of the switch arm to position 2, so as to project their beams laterally through the transparent panel h. The tail piece $q^1$ of arm q acts as a bridge between the contacts for positions 1 and 2 so that both lamps c and i may be illuminated. If it is desired to extinguish the bulbs c while maintaining the light of the bulb i, the switch arm is set to the position 3. By means of the handle g, the casing a can be tilted so that the lateral beams are directed above or below the horizontal, as desired.

By opening the rear of the casing, as by unscrewing the cap k or releasing the hinged flap l, light from the rear bulb i can be obtained for work at the back of the vehicle, and similarly by throwing back the hood n or unscrewing the cap $n^1$, light from the front bulb c can be obtained for work at the front of the vehicle.

Having thus described my invention what I claim is:—

1. A road vehicle lamp, comprising a casing, a glass-provided front to said casing, supporting means for holding said casing in position in such a way that it can be turned about an axis of rotation which passes through said casing and from front to rear of said casing, a lateral transparent panel to said casing, alternative electrical sources of light fitted within said casing, one of said sources adapted to project a forward beam through said glass front, the other of said sources adapted to project when required a lateral beam through said lateral panel, means for controlling both beams from the vehicle, a lever secured to the casing for turning said casing by hand about its axis of rotation, and an opaque cover for the rear of said casing, said cover normally confining the illumination of said other source of light to the interior of said casing for projection through said lateral panel but being displaceable to allow light from said other source to be projected rearwardly of the lamp casing.

2. A road vehicle lamp comprising in combination a casing, means for holding said casing in position in such a manner that said casing can be partly rotated in said holding means about an axis which passes through said casing and from front to rear thereof, a lateral transparent panel to said casing, alternative electrical lamp bulbs fitted within said casing, one of said bulbs adapted normally to project a forward beam of light, the other of said bulbs adapted to project when required a lateral beam through said lateral panel, means for controlling both beams from the vehicle, an operating lever directly secured to said casing, a hood secured to the front end of the casing, and a lens carried by said hood, said forward beam of light being normally projected through said lens, said hood extending backwards to the level of the forward bulb and being displaceable to allow free outward illumination by said forward bulb.

3. A road vehicle lamp, comprising a cylindrical casing, a circular collar for engaging and adjustably holding said casing in position, said collar being slotted longitudinally for part of its length and said cylindrical casing being turnable in said collar about an axis which passes longitudinally through said casing, a supporting arm secured to said collar, a lateral translucent panel to said casing, alternative electrical sources of light fitted within said casing, one of said sources adapted to project a forward beam, the other of said sources adapted to project when required a lateral beam through said lateral panel, an electrical switch mounted on the vehicle for controlling both beams from the vehicle, a hand-operated lever for turning the casing about its axis of rotation, said lever being secured to said casing and passing through the slot in said collar, and means for locking said lever in position in the slot in said holding collar.

In witness whereof I hereunto affix my signature.

WILLIAM ERNEST WISH.